United States Patent [19]
Edwards et al.

[11] Patent Number: 5,575,730
[45] Date of Patent: Nov. 19, 1996

[54] MULTIPLE-INPUT INFINITE-SPEED INTEGRAL MOTOR AND TRANSMISSION DEVICE

[76] Inventors: Jonathan Edwards, 41 E. Pax Beach Rd., California, Md. 20619; Dave Tether, Rte. 3, Box 79, Lexington Park, Md. 20653

[21] Appl. No.: 246,785

[22] Filed: May 20, 1994

[51] Int. Cl.$^6$ ............................................. F16H 48/10
[52] U.S. Cl. .......................... 475/5; 475/6; 475/9
[58] Field of Search ............................. 475/5, 6, 9

[56] References Cited

U.S. PATENT DOCUMENTS

| | | | |
|---|---|---|---|
| 2,578,837 | 12/1951 | Raney | 475/5 |
| 4,354,144 | 10/1982 | McCarthy | 475/9 |
| 4,729,258 | 3/1988 | Mohri et al. | 475/9 |
| 5,067,932 | 11/1991 | Edwards | 475/9 |
| 5,168,946 | 12/1992 | Dorgan | 475/6 |
| 5,396,968 | 3/1995 | Hasebe et al. | 475/6 |

FOREIGN PATENT DOCUMENTS 0095238  5/1985  Japan .................................. 475/6

Primary Examiner—Dirk Wright
Attorney, Agent, or Firm—Hazel & Thomas

[57] ABSTRACT

A combination electric motor and transmission unit device has at least three inputs and at least two rotational mechanical outputs, at least one of the inputs being of electrical power, to a corresponding integral combination of an electric motor means with a transmission means. The directions of rotation and the rotational speeds of the three inputs may be controlled to provide the mechanical outputs at any desired rotational speed with peak power output, depending on the controls, thus providing an ideal infinite speed device. The device employs a novel arrangement of a differential unit or a planetary gear unit. The combined motor and transmission device is lightweight, requires a small number of moving parts, and is useful in vehicles powered by electricity, including for regenerative braking. Another embodiment of the drive device is useful for a flywheel for peak power supplementation and also regeneration.

5 Claims, 6 Drawing Sheets

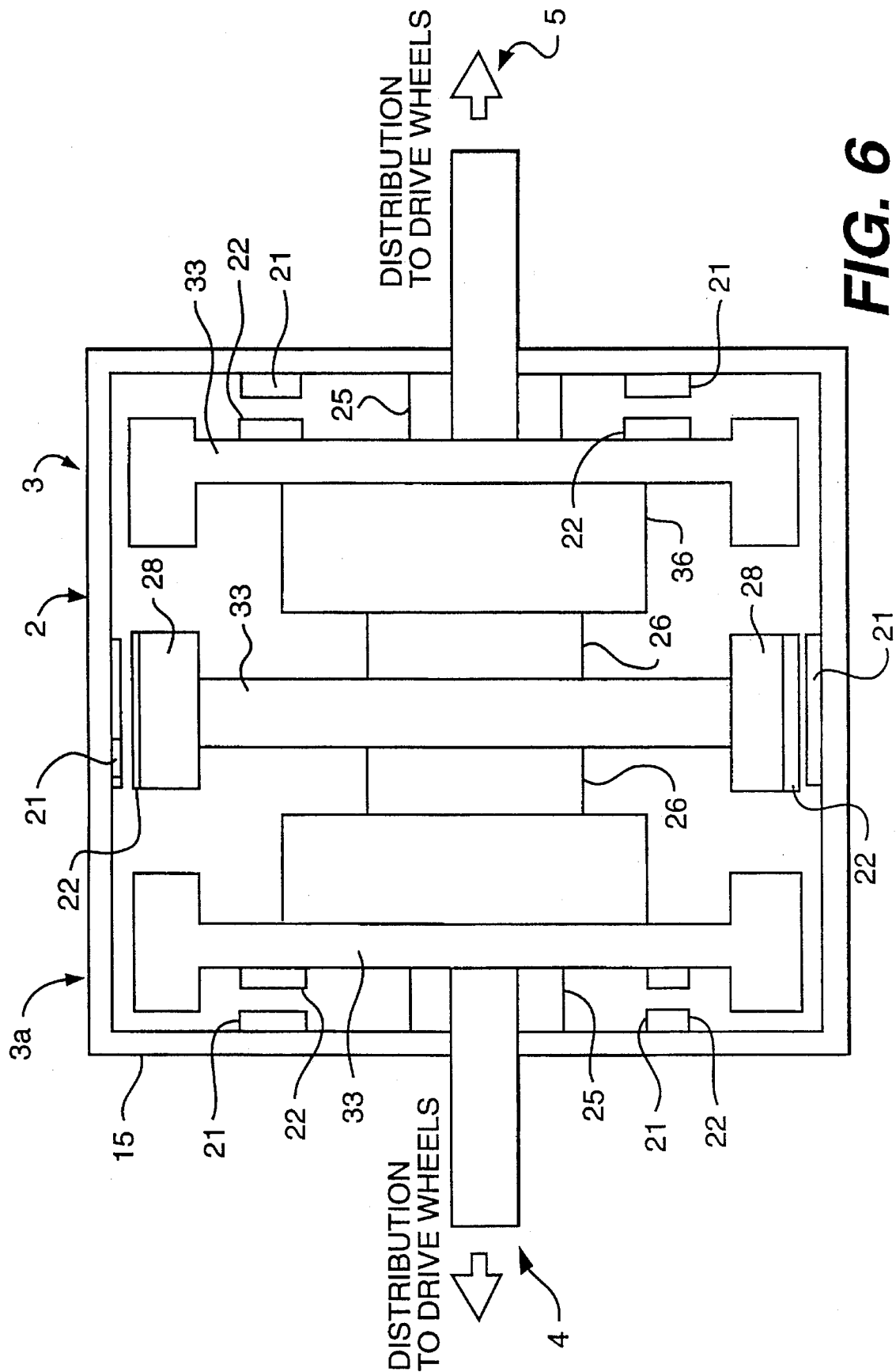

MULTIPLE-INPUT INFINITE-SPEED INTEGRAL MOTOR AND TRANSMISSION DEVICE

CROSS-REFERENCE TO RELATED APPLICATIONS

This application makes reference to the following U.S. Applications. The first application is U.S. application Ser. No. 08/229,237, entitled "ELECTRIC WHEEL COOLING SYSTEM", filed Apr. 18, 1994. The Second Application Number is Ser. No. 07/618,934, which issued as U.S. Pat. No. 5,067,932, entitled "DUAL-INPUT INFINITE SPEED INTEGRAL MOTOR AND TRANSMISSION DEVICE." The above identified applications and patents are hereby incorporated by reference.

BACKGROUND OF THE INVENTION

1. Field of the Invention

The present invention relates generally to an integrally formed combination of a motor device and a transmission device, having multiple power inputs and at least two power output having a continuously variable speed of rotation over a large range. The invention employs novel uses of a differential unit or a planetary gear unit. It is useful for rotating a drive wheel of an electric vehicle, or as a flywheel unit for power storage and delivery in a conventional vehicle.

2. Description of the Prior Art

It has long been a goal in the an to find a combination power source (i.e., drive) and transmission device that can deliver the peak output of the power source over a large range of the rotational speed (rpm) output of the transmission device. Further, it is preferable that this peak power be output from the transmission device, or from the drive device incorporating the transmission device, at continuously variable speeds of rotation over a large range of the speed of rotation of the output. A transmission device making possible such properties is known in the art as an infinite speed transmission device. The term "drive and transmission device" or "combination motor and drive device" is employed in the present disclosure to describe the case of the device including the drive means (i.e., power source means) as well as the transmission means. The term "motor and transmission device", or "combination motor and transmission device", is employed for the case of the drive means including an electric motor means, as the drive means (i.e., power source).

Known transmission devices typically involve a single rotational mechanical input and a single rotational mechanical output. Such know transmission devices, whether manual or automatic, may typically employ a set of gears. In these transmissions, the ratio of the speed of rotation of the input to the speed of rotation of the output is one of a set of fixed values corresponding to the set of gears. These typically involve a large number of parts, undesirable weight for many applications particularly in vehicle propulsion, and high losses due to multiple transfers of the power between the many components within the transmission device, or within the drive device incorporating the transmission device.

The mechanical rotational input for such known transmission devices can be the output of a gasoline or electric motor, many of which typically have a limited speed (rpm) range for peak power. As a result, the transmission device may not have a continuously variable output rotational speed for the speed of the motor in the peak power range.

The effective range over which the peak power output can be maintained increases with the number of gears in the transmission device, but only in the sense that the range is made up of overlapping sub-ranges, each sub-range being a narrower rpm range over which the peak power is output when the known transmission device is in a respective one of the gears. However, the larger the number of gears, the heavier and more expensive the transmission device becomes, and the less efficient due to the number of interfaces (mechanical links) across which the power must be transferred.

Differential units and planetary gear units are known in the art as transmission devices. The typical use of the differential transmission unit is in a vehicle, to distribute the power from the drive shaft to the pair of drive wheels. In this use the rotational mechanical input of the drive shaft is transmitted by a gear fixed on the end of the drive shaft to a ring gear of the differential transmission unit. The ring gear is attached to a frame which holds a pair of pinion gears to rotate between a pair of drive gears. Each of the drive gears is fixed to a shaft to turn a respective one of the two drive wheels. The two drive gears rotate coaxially, and the output rotates about an axis transverse to the axes of the drive gears.

Rotation of the pair of pinion gears between the drive gears allows the two wheels to rotate independently while both drive the vehicle. The amount of rotation of the pair of pinion gears corresponds to the difference in rotation between the two drive wheels, such as for going around corners or when one of the drive wheels loses traction.

Known planetary gear types of transmission devices involve an inner sun gear, an outer ring gear and a set of planetary pinions held by a hub to rotate between the sun gear and the ring gear. When the sun gear rotates with respect to the ring gear, the planetary pinions rotate between them, and the hub rotates accordingly, coaxially with the sun and ring gears.

In a typical prior art use of the planetary gear unit, the hub is fixed, and either the sun gear or the ring gear is driven as the rotational mechanical input, the other providing the rotational mechanical output. Alternatively, either the sun gear or the ring gear can be fixed, the other is either the rotational mechanical input or output, and the hub provides the other of the rotational mechanical input or output.

In the prior art, combinations of a transmission device and an electric motor drive device typically involved use of a separate electric motor, the shaft of which extends to provide a rotational mechanical input to the transmission device. The shaft is typically supported by two bearings at two separated parts of the shaft, the motor elements being located between the positions of the bearings.

The prior art does not involve combining any of the essential elements of the electric motor means integrally with the essential elements of the transmission means, nor the supporting of the element of the electric motor with a single bearing. Thus the prior art arrangements for combined motor and transmission means involved a large number of parts and an undesirable associated weight.

SUMMARY OF THE INVENTION

An object of the invention is to provide an infinite speed combination motor and transmission device, namely which can deliver peak power output with a continuously variable speed of rotation over a very large range of the rotational speed of the output.

Another object of the invention is to provide an infinite speed combination motor and transmission device having multiple inputs, at least one of the inputs being an integral combination of an electric motor element and a transmission unit element.

Yet another object of the invention is to provide a combination motor and transmission device employing a novel arrangement of a differential transmission unit or a planetary gear unit.

A further object of the present invention is to provide a combination motor and transmission device for providing an electric differential device in a conventional automobile, wherein each device has multiple power inputs including at least one which involves an integral combination of an electric motor means and a transmission means, for effectively propelling the vehicle.

Another object of the invention is to provide a combination motor and transmission device, for driving a wheel of an electrically powered vehicle, which is lightweight and highly efficient, as a result of a small number of parts, low losses and regenerative braking with antilock braking easily adapted.

Yet another object of the present invention is to provide a flywheel unit employing the combination motor and transmission device of the present invention in a conventional vehicle, for storing power for supplementing peak power when needed, and as well for regenerative braking.

Other objects and features of the present invention will be apparent from the following detailed description of the preferred embodiment.

BRIEF DESCRIPTION OF THE DRAWINGS

The invention will be further described in conjunction with the accompanying drawings, in which:

FIG. 6 shows a flywheel embodiment of the combination motor and transmission device of the present invention, for storing and providing energy for propelling a vehicle.

DETAILED DESCRIPTION OF PREFERRED EMBODIMENTS

The present invention will be understood from the detailed description of the specific embodiments hereinbelow and from the respective drawings. The description and drawings of the embodiments are for explanation only, and are not intended in any way to limit the invention.

Figure 1:
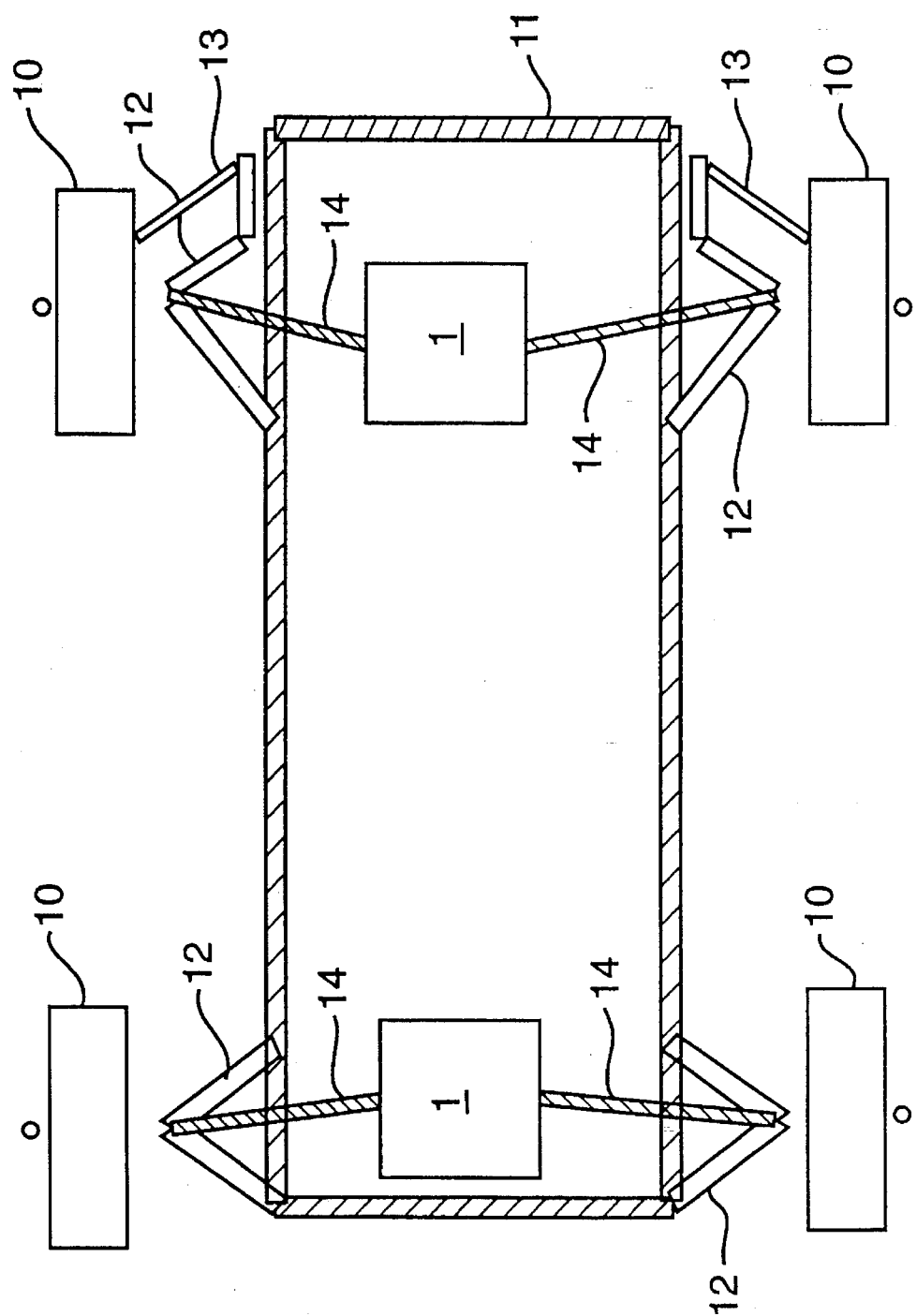
FIG. 1 shows an electric-powered vehicle having a combination motor and transmission device constructed in accordance with a preferred embodiment of the invention.

An electrically powered vehicle, having for instance its four wheels 10 driven by respective ones of the combination motor and drive transmission devices 1 of the present invention, is shown in FIG. 1. As is shown only schematically, the four suspension units are connected to the undercarriage or supporting frame 11 of the vehicle, and each is indirectly connected at its other end to a respective wheel 10. The steering members 13 connecting to the two front wheels 10 provides for steering the vehicle. Conventional means may be employed for the suspension and steering members 12, 13.

In the illustrated embodiment, each combination motor and transmission device 1 is incorporated into a differential of a conventional automobile. The output of each combination motor and transmission device 1 is along axle element 14, to which the wheels 10 are connected.

Figure 2:
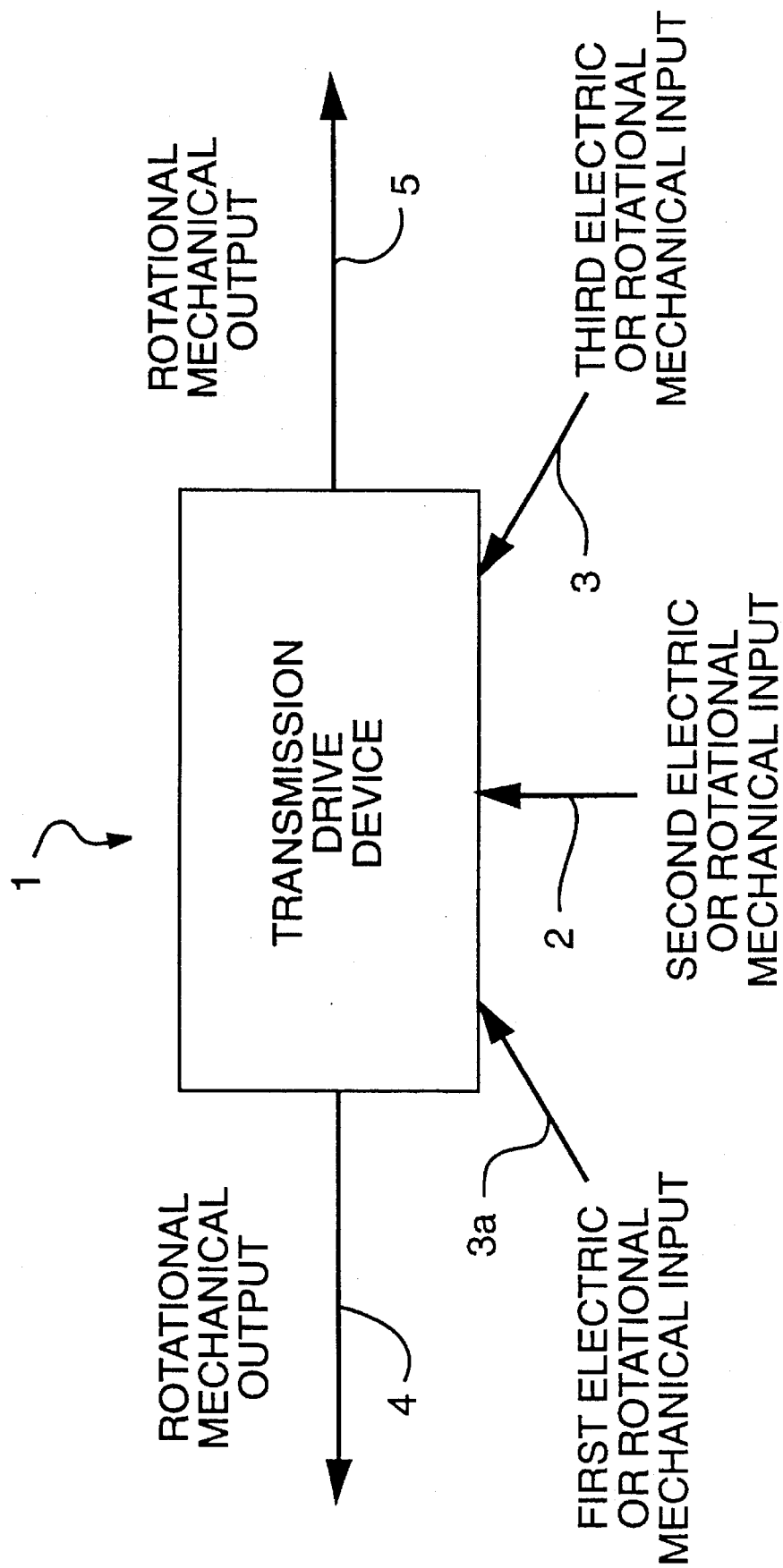
FIG. 2 shows the general characteristics of the combination motor and transmission device of the present invention, having at least three inputs of electrical power and at least two rotational mechanical power outputs.
Figure 3:
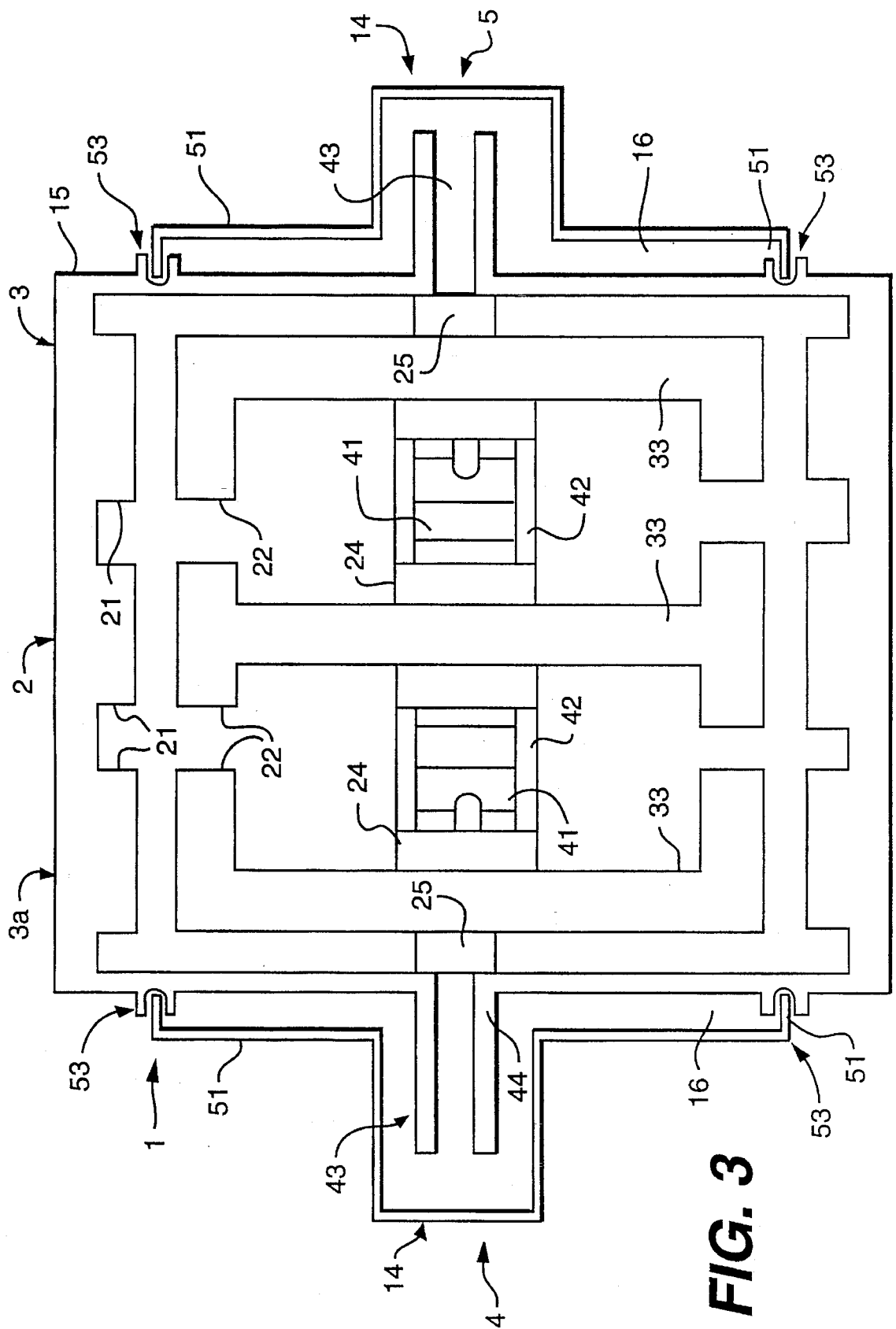
FIG. 3 shows an embodiment of the combination motor and transmission device of the present invention employing a differential unit.

The generic features of the combination motor and transmission device 1 of the present invention are indicated in FIG. 2. The multiple inputs 2,3,3a are for input of power. At least one of these inputs 2,3,3a is an electrical power input, to drive an integrally formed combination of an electric motor element and a transmission unit element within the device 1. For instance, the electric motor element might be the armature of the electric motor, mounted on the rotating ring gear as the essential element of a differential unit transmission, as illustrated in FIG. 3. Alternatively, the essential electric motor element may be the field assembly, and the essential motor element another part of the transmission unit. The rotational speed, such as from a negative maximum value to a positive maximum value in various embodiments of the present invention.

FIG. 3 shows an embodiment of the combination motor and transmission device 1 of the present invention employing a differential unit in a novel manner. The device 1 includes a half 15 of a housing which, when the device is employed in a differential as in FIG. 1, may be fixed directly to axle 14 or to some other appropriate member of the vehicle.

The multiple inputs 2,3,3a to the motor and transmission device 1 are located below the corresponding arrows. In this embodiment the inputs are in the form of electrical power which is converted internally to mechanical power. The outputs 4 for rotating the drive wheels 10 is via shaft 43, which is fixed at its outer end to axle 14 for rotating it. Spindle 44 is hollow, to allow shaft 43 to rotate freely within it, to deliver the rotational force for rotating wheels 10 free from the weight of the load on wheels 10.

Turning to the invention, the input 2 includes for instance a field element 21 fixed on the interior of the housing portion 15, to interact with for instance an armature element 22 fixed on the outer periphery of a circular disk 33, which is shown edgewise in FIG. 3. Although not shown in FIG. 3, a plurality of the field elements 21 are spaced around the interior of the housing 15, and a plurality of the armature elements 22 are provided around the periphery of the disk 33 (only one set of field and armature elements 21,22 are illustrated).

Disk 33 is supported by a bearing 25 fixed on housing 15, and is accordingly forced to rotate about an axis collinear with wheel 10. Mounted fixedly on disk 33 is a drive gear 24, a cylindrically bevelled front of which is grooved to form gear teeth. In this embodiment, inputs 3,3a have essentially the same components as input 2, as is indicated in FIG. 3.

Proceeding to outputs 4 and 5, a pinion gear shaft 41 holds a pair of pinion gears 42 to rotate between the opposing drive gears of the inputs 2,3 and 2,3a, namely drive gear 24 on input 2 and the corresponding drive gear on input 3 or 3a as indicated in FIG. 3. The pinion gear shaft 41 is rigidly (non-rotatingly) connected at a right angle and at its center to shaft 43 for rotating wheels 10.

When bevelled drive gear on input 2 and the corresponding opposing drive gear on input 3 or 3a are driven by electrical inputs to rotate at the same speed, then pinion gears 42 do not rotate on pinion gear shaft 41. In this case, pinion gear shaft 41 rotates at the same speed (in a plane perpendicular to the paper), and wheel 10 is also rotated at this rotational speed. When the two opposing bevelled gears are driven at different speeds, including the case of opposite directions, then pinion gear shaft 41 is caused to rotate at a speed intermediate between the rotational speeds of the two opposing bevelled drive gears, by virtue of pinion gears 42 rotating on pinion gear shaft 41.

Wheels 10 are thus driven at their maximum speed, in either the forward or reverse direction, when the three inputs 2,3,3a are in the same direction, forward or reverse, and at their respective maximum speeds. As the speed of one of the inputs decreases, wheels 10 slow down. Thus the speed with which wheels 10 may be rotated is continuously variable, from full forward speed to full reverse speed.

If the source of electrical power is a battery, then wheels 10 may be driven with full battery power at any speed in the range between full forward and reverse speeds. As is explained in the following, the combination motor and transmission device 1 may provide full power to wheels 10 while rotating it at any speed in this large range, thus being an effective and efficient infinite speed transmission device.

If the input 2 is driven at nearly equal but opposite speeds to inputs 3,3a, then wheels 10 are rotated at very low speed, but with very high available torque, corresponding to the available peak power from the battery. For each such output speed below the extreme maximum forward speed and the extreme maximum reverse speed, there is in fact a continuum of the combinations of the speeds of the inputs 2 3,3a. It should be appreciated that input 3 may be driven at a different speed than input 3a. This would result in respective wheels 10 being driven at different speeds. Thus, torque steering is possible. Additionally, it is possible to assist the vehicle in maintaining a tighter turning radius in a banked turn. This is because, in a turn, the inside wheels 10 rotate at a different speed that the outside wheels 10. Thus, by dynamically controlling each wheel 10 speed, one may reduce tire wear and increase responsiveness in a turn.

The width of this continuum of combinations, that is, the effective number of the combinations for any one output speed, increases with decrease in the output speed below the maximum speed. Thus, different control strategies can be selected, in controlling the change in speed of the output, depending on the characteristics of the power sources for the inputs and of the load.

The transmission and drive device of the present invention is small and lightweight enough to fit with the transaxle assembly within a conventional vehicle. It is small and lightweight, since a variety of lightweight materials could be used for its construction. It is estimated that the transmission and drive device of the present invention could have a mass of as little as approximately 16 or 18 kg or less.

An auxiliary braking means is indicated in FIG. 3, by the band or lip (drum) 51 extending horizontally from disk 16. This band 51 extends between the pair of calipers 53 for clamping onto it, for providing auxiliary braking force. Thus, effectively the entire device, including brake means, fits within the space of the transaxle assembly.

Other arrangements for bearings to support shaft 43 and disk 33 may be used. For simplicity, two further embodiments of the transmission and drive devices of the present invention are described in the following with shaft 43 connecting indirectly to wheel 10, with wheel 10 being outboard of device 1.

Figure 4:
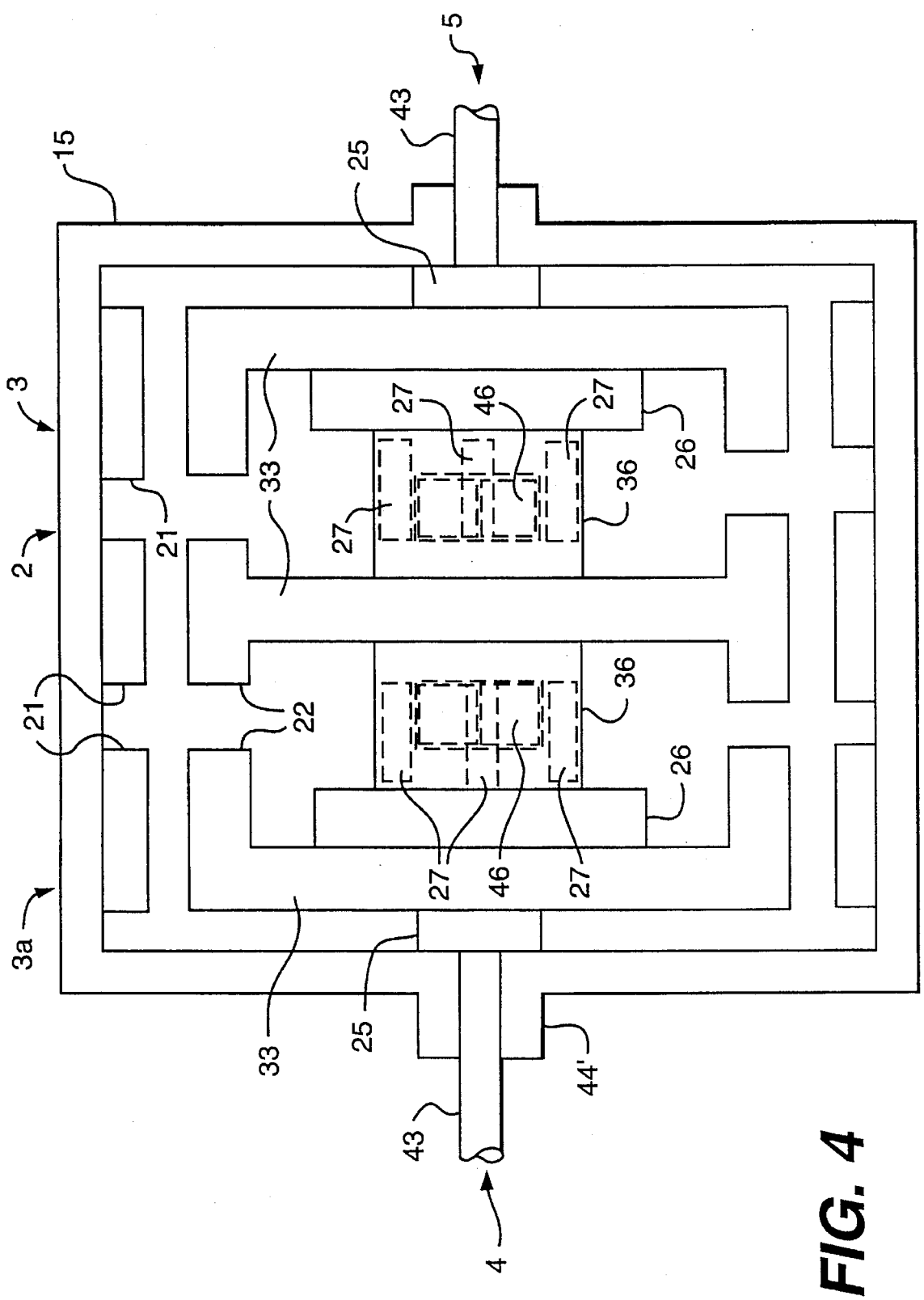
FIG. 4 shows an embodiment of the combination motor and transmission device of the present invention employing a planetary gear unit.

FIG. 4 shows an embodiment of the transmission device of the present invention employing a planetary gear unit. Parts identical to those of the embodiment of FIG. 3 are shown with the same reference numbers, and are not described again. The simplified outputs 4 and 5 shows axle 43 supported by a bearing half 44' connected to housing half 15. The significant differences arise in replacing the differential gear unit with the planetary gear unit.

The outermost member of the planetary gear unit is the ring gear 36, the teeth in which are on the inside periphery of the hollow cylindrical member of the ring gear 36 not shown. The end of the cylindrical member of the ring gear 36 may be closed, but in any case, is rigidly fixed, in this example, to disk 33 of input 3 or 3a, to rotate with it.

Inside ring gear 36 is located sun gear 46 (indicated with dotted lines only) and the hub. A portion 26 of the hub is shown extending to the left or right for rigid connection to disk 33 of input 2. Both sun gear 46 and the hub (with its portion 26) rotate concentric with ring gear 36. Shaft 43 extends to the right or left to connect rigidly with the sun gear 46, to rotate with it. Spacer 26 typically has at least three planetary gears 27 (also indicated only by the dotted lines in FIG. 4) attached to it, to rotate between the sun gear 46 and ring gear 36.

Figure 5:
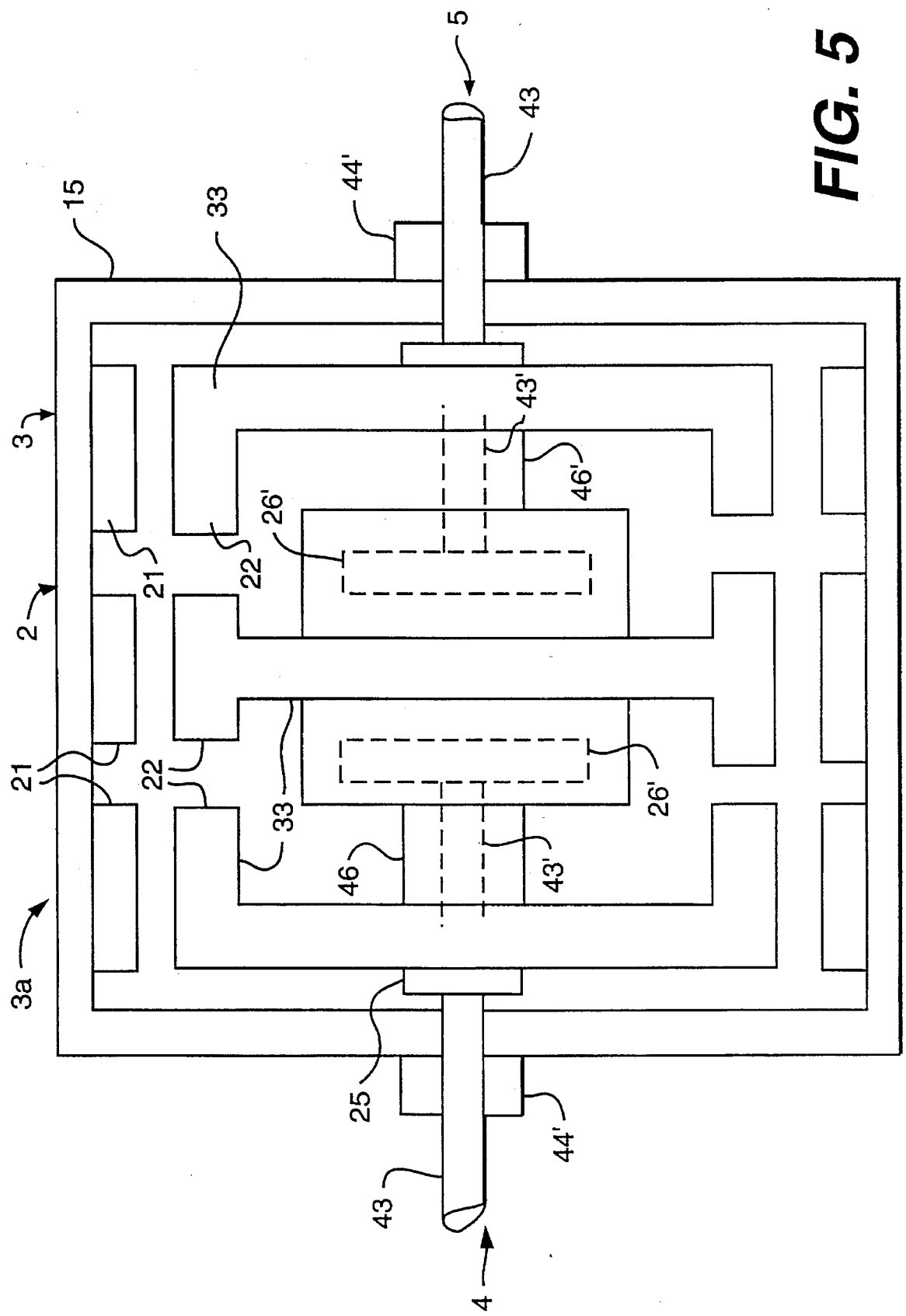
FIG. 5 shows another embodiment of the combination motor and transmission device of the present invention employing a planetary gear unit.

FIG. 5 shows another embodiment of the transmission device of the present invention employing a planetary gear unit. Here, disk 33 of the input 2 is rigidly connected to an extension 46' of the sun gear, so as to turn the sun gear when input 2 is activated. The sun gear and its extension 46' are cylindrically hollow along the axis of the sun gear, to allow an extension 43' (indicated by dotted lines) of shaft 43 to extend to the right or left along its axis to connect rigidly and nonrotatingly with hub 26' of the planetary gear set.

The planetary gear unit embodiment of FIG. 4 has a higher output speed than that of FIG. 5, assuming equal maximum speeds of the inputs in each case. Namely, in the embodiment of FIG. 4, the output rotational speed is some weighted sum of the input speeds, the weights depending on the relative diameters of the gears of the planetary units. Specifically, in the embodiment of FIG. 4, the output speed may easily be larger than any single input speed. This embodiment may thus be considered to have a high speed capability, namely to have some "overdrive" characteristic.

By contrast, the embodiment of FIG. 5 should be considered to be more of a "low gear" device, since the output speed cannot exceed that of any one input. Namely, like the differential unit embodiment of FIG. 3, the maximum output speed occurs when all inputs are at the maximum speed in the same direction.

This latter feature involves the most important distinction between the embodiments of FIGS. 4 and 5, namely the embodiment of FIG. 5 is much more efficient than that of FIG. 4, at least at top speed, when the two inputs to device 1 are such that all discs 33 rotate at the same speed. In this case, the hub and the planetary gears held by the hub (not shown in FIG. 5, but see hub 26 and the indicated planetary gear 27 in FIG. 4) do not rotate, with respect to sun gear 46 and ring gear 36, but rather rotate with them. Thus, there is no loss as occurs when these do not rotate together, as in the embodiment of FIG. 4 at top speed when the relative motion of planetary gears 27 and hub 26, and the associated losses, are large.

The rotational mechanical output of the transmission drive device may be provided at any desired rotational speed, power or torque, depending on the load and the controls for the two inputs. Any type of electrical motor may be incorporated into each input, for converting electrical power supplied to the motor to rotating mechanical power of that input.

As shown in FIGS. 3, 4 and 5, a feature of the present invention is that an essential electric motor element, such as armature element 22, is integrally connected with an essential transmission unit element, such as drive gear in FIG. 3, hub 26 in FIG. 4, or sun gear 46 (via the extension 46') in FIG. 5. This is a most effective approach for reducing the number of components, size and weight of the motor and transmission device. This reduction includes a reduction from the number of bearings required in the prior art to support both ends of the motor output shaft, namely the shaft which then serves as a rotational mechanical input to the transmission device in prior art combination. As may be seen from the drawings, there are minimal side forces acting on the illustrated essential elements of the transmission means, so further bearings are not necessarily needed. Thus, a single bearing may be made, by appropriate design in each specific case, to suffice for the essential transmission part carrying the essential electric motor part with which it is combined. Namely, most of the loading may effectively be provided in a single plane perpendicular to the axis of rotation of the essential transmission part.

A stepping motor is particularly useful for controlling the angular position as a function of time, and accordingly the speed, of the rotational mechanical inputs, to allow controlling the speed of the rotational mechanical output to a desired value. As is known in the art, the torque output of a stepping motor typically falls with increasing rotational speed, from a maximum torque at zero or low rpm. By contrast, the typical power output of a stepping motor quickly rises with increase in rpm from zero to a plateau value of the output power, namely power output remains at this plateau for a very large range of rpm.

Thus, when multiple stepping motors are employed in the multiple inputs of the transmission drive device of the present invention, the sum of the peak powers of the multiple stepping motors is effectively available at the outputs, when each motor is driven at a rotational speed above the minimum speed for providing the plateau value for its peak power output.

As is easily understood, this total peak power output of the transmission device of the present invention is available at any output speed. Accordingly, at low output speed, the output torque may be very high.

A stepping motor is particularly advantageous for use in the drive devices of the present invention, which might be employed in a battery powered vehicle. It is lightweight and efficient, and is easily controlled to provide a desired output rotational speed (rpm). Its high efficiency is nearly constant over its large rpm range, unlike most other electric motors, many of which substantially lose overall efficiency as they are slowed down. Also, the stepping motor has high torque at low rpm, unlike many other types of electric motors. Most other motors cannot be slowed substantially and run backwards.

A relatively low top speed (rpm) of the electric motors acting as inputs 2,3,3a would be required for use in the illustrated embodiments, all of which employ a one to one ratio of armature rotation to wheel rotation. Thus, for the normal tire size, a top speed of 800 to 1000 rpm would generally suffice for most purposes, for each rotational mechanical input 2, 3,3a.

Use of a computer to control the stepping motors in the drive device of the present invention would easily allow for cornering, such as by driving the two front wheels that are being steered at different output speeds depending on the radius of the turn as sensed by the computer, such as by the angle to which the steering wheel is turned by the driver. Individual control of the speed of each drive wheel is effective for avoiding loss of traction and corresponding spinning of a drive wheel, as occurs frequently, for instance, with cars in the prior art employing differential transmissions for power distribution between pairs of drive wheels. Additionally, torque steering may be provided by rotating each front wheel at a different speed. Thus, power assisted steering is possible.

An important advantage of the present invention is that auxiliary braking of the vehicle may be performed by the drive devices of the present invention being used as generators, namely by regenerative braking. In the case of a battery powered car, the kinetic energy of the vehicle may be converted back into useable electricity charged back into the battery, and hence available for subsequently propelling the car. Thus, a small lightweight hydraulic brake, such as on each disk 16, suffices as backup and emergency brakes for the vehicle.

The infinite-speed characteristic of the combination motor and transmission device of the present invention is particularly useful for this purpose, namely in being able to adjust the device for maximum regeneration. In generic terms, this involves converting either output 4 or 5 above into an input, and at least one of the inputs 2,3, 3a into an output.

Increased braking power may be obtained by operating the combined motor and transmission device so that a very high rpm of at least one of the two inputs drives the respective electric motor element for considerable regeneration of power. If the controls are set for this same "high gear" regeneration mode, an effective parking brake is provided, at the cost of a small current drain, while the vehicle is parked.

Some considerations for controlling electrical power inputs to the combination motor and transmission device of the present invention are as follows. A first control strategy for operating the device of the present invention for bringing a vehicle to speed from standstill is simple. Each rotational mechanical input 2,3,3a would start at zero rpm, and be speeded up to speed together, thus avoiding any relative rotation of pinion gears 42, for the embodiment of FIG. 3.

A more complex approach for the embodiment of FIG. 3 would be to start with all rotational mechanical inputs 2,3,3a at the same speed but in opposite directions, e.g., input 2 opposing the directions of inputs 3 and 3a, and to slow one more than the other until, at top speed of the vehicle, the three mechanical inputs are rotating together in the same direction. This, in effect, provides a flywheel-type supplementation of the peak power from the battery by taking kinetic energy stored in advance in one of the rotating disk 33.

FIG. 6 shows another embodiment of the present invention for use as a flywheel for storing energy and supplying some when needed. This shows a combination motor and drive device 1 having three inputs 2,3,3a of electrical energy and outputs 4 and 5 of rotational mechanical energy, which however may be reversed in the sense of what constitutes an input or output, as mentioned above for the preceding embodiments in the case of regenerative braking.

However, the purpose of this embodiment is to store energy for times of peak power need, such as for either foreseen or unexpected acceleration events, or for mechanical storage of kinetic energy obtained when the vehicle was braked, by speeding up the flywheel by the braking process itself to convert the kinetic energy of the entire vehicle to kinetic energy of the one or more flywheels contained in the combination motor and transmission device 1. Various designs may be suited to these various purposes. It suffices to describe the embodiment of FIG. 6 as directed to supplementation of peak power only.

Input 2 includes the field assembly units 21 distributed about the inside of half of housing 15, and armature units 22, located on the top side of disk 33, which has a heavy cylindrical peripheral mass 28 for increasing the moment of rotational inertia. Inputs 3,3a have similar components. This embodiment shows the ring gear 36 and hub 26 of the planetary unit embodiment of FIG. 4, respectively connected to disks 33.

The outputs 4,5 are by shafts 43, which leads downwards for indirect engagement with drive wheels 10. This combination motor and transmission device 1 may be employed in the ordinary vehicle having a differential unit connecting the two drive wheels.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A combination motor and transmission device comprising:

at least three power input means, hereinafter referred to as a first, second and third power input means, said input means for receiving at least three inputs of electrical power; and power conversion means for convening said electrical power of said first, second and third inputs for providing at least two outputs, said power conversion means, including a mechanical power transmission unit, said power transmission unit having at least three inputs for respectively receiving mechanical power corresponding to said first, second and third power inputs provided to said first, second and third power input means and at least two outputs for outputting the converted power as rotational mechanical power, wherein the rotational speed of said outputs are continuously variable, and said power conversion means includes, for each of said first, second and third power inputs, a respective integral combination of a respective electric motor element and an element of said mechanical transmission unit, each said integral combination involving said two respective elements thereof being directly associated mechanically and geometrically with each other without substantial spacing or other elements, including bearings and shafts therebetween;

wherein each of said integral combinations are within an envelope containing the other, whereby a compact structure is provided for each said integral combination, and said integral combinations are located closely adjacent each other;

wherein each said envelope is that of said respective motor element of the respective one of said integral combinations, and each said envelope has effectively a cylindrical symmetry; and wherein said transmission unit comprises a differential unit which includes:

at least three opposing drive gears, corresponding to said at least three inputs of said transmission unit;

a first pair of pinion gears rotating on a first shaft between a first pair of opposing drive gears;

a second pair of pinion gears rotating on a second shaft between a second pair of opposing drive gears;

a third shaft connected at a first end perpendicularly to the center of said first shaft, the other end of said third shaft providing one of said rotational mechanical power outputs;

a fourth shaft connected at a first end perpendicularly to the center of said second shaft, the other end of said fourth shaft providing one of said rotational mechanical power outputs; and a housing surrounding, at least in part, said drive gears, pinion gears, first, second, third and fourth shafts;

wherein each said integral combination comprises a respective one of said drive gears as the respective element of said transmission unit, each said drive gear being mechanically connected with the respective electric motor element.

2. A combination motor and transmission device comprising:

at least three power input means, hereinafter referred to as a first, second and third power input means, said input means for receiving at least three inputs of electrical power; and power conversion means for converting said electrical power of said first, second and third inputs for providing at least two outputs, said power conversion means, including a mechanical power transmission unit, said power transmission unit having at least three inputs for respectively receiving mechanical power corresponding to said first, second and third power inputs provided to said first, second and third power input means and at least two outputs for outputting the converted power as rotational mechanical power, wherein the rotational speed of said outputs are continuously variable, and said power conversion means includes, for each of said first, second and third power inputs, a respective integral combination of a respective electric motor element and, an element of said mechanical transmission unit, each said integral combination involving said two respective elements thereof being directly associated mechanically and geometrically with each other without substantial spacing or other elements, including bearings and shafts therebetween;

wherein said transmission unit comprises a differential unit which includes:

at least three opposing drive gears, corresponding to said at least three inputs of said transmission unit;

a first pair of pinion gears rotating on a first shaft between a first pair of opposing drive gears;

a second pair of pinion gears rotating on a second shaft between a second pair of opposing drive gears;

a third shaft connected at a first end perpendicularly to the center of said first shaft, the other end of said third shaft providing one of said rotational mechanical power outputs;

a fourth shaft connected at a first end perpendicularly to the center of said second shaft, the other end of said fourth shaft providing one of said rotational mechanical power outputs; and a housing surrounding, at least in part, said drive gears, pinion gears, first, second, third and fourth shafts;

wherein each said integral combination comprises a respective one of said drive gears as the respective element of said transmission unit, each said drive gear being mechanically connected with the respective electric motor element.

3. The combination motor and transmission device of claim 2, comprising:

a first element of said first electric motor being an armature that is connected rigidly to a respective peripheral part of a first one of said at least three opposing drive gears to rotate with said first drive gear;

a first element of said second motor being an armature that is connected rigidly to a respective peripheral part of the second one of said at least three opposing drive gears to rotate with said second drive gear;

a first element of said third motor being an armature that is connected rigidly to a respective peripheral part of the third one of said at least three opposing drive gears to rotate with said third drive gear;

a second element of said first electric motor being a first field assembly that is connected mechanically to said housing at a location to interact by its field with said armature on said first drive gear;

a second element of said second electric motor being a second field assembly that is connected mechanically to said housing at a location to interact by its field with said armature on said second drive gear; and a second element of said third electric motor being a second field assembly that is connected mechanically to said housing at a location to interact by its field with said armature on said third drive gear;

wherein each said element of the respective one of said electric motors of each said integral combination is said armature thereof.

4. A combination motor and transmission device comprising:

at least three power input means, hereinafter referred to as a first, second and third power input means, said input means for receiving at least three inputs of electrical power; and power conversion means for converting said electrical power of said first, second and third inputs for providing at least two outputs, said power conversion means, including a mechanical power transmission unit, said power transmission unit having at least three inputs for respectively receiving mechanical power corresponding to said first, second and third power inputs provided to said first, second and third power input means and at least two outputs for outputting the converted power as rotational mechanical power, wherein the rotational speed of said outputs are continuously variable, and said power conversion means includes, for each of said first, second and third power inputs, a respective integral combination of a respective electric motor element and an element of said mechanical transmission unit, each said integral combination involving said two respective elements thereof being directly associated mechanically and geometrically with each other without substantial spacing or other elements, including bearings and shafts therebetween;

wherein each of said integral combinations are within an envelope containing the other, whereby a compact structure is provided for each said integral combination, and said integral combinations are located closely adjacent each other;

wherein each said envelope is that of said respective motor element of the respective one of said integral combinations, and each said envelope has effectively a cylindrical symmetry; and wherein said transmission unit comprises a planetary gear unit which includes a first inner sun gear;

a first outer ring gear which has an axis of rotation collinear with that of said first inner sun gear;

a second outer ring gear which has an axis of rotation collinear with that of said second inner sun gear;

two sets of planetary gears held by respective hubs, each of said planetary gears being held by said respective hub to rotate in unison between said first inner sun gear, and said respective outer ring gear, said planetary gears rotating relative to said respective hub in dependence on the difference in rotation between said respective inner and outer gears, said respective hub rotating in dependence on the sum of two rotational velocity components, the first rotational velocity component being the common rotational velocity of said first sun gear and said first and second ring gears, and the second velocity component being the difference between the rotational velocity of said first sun gear and said first and second ring gears and, a housing surrounding, at least in part, said electric motors and transmission unit; and further comprising a first element of said first electric motor being an armature that is connected rigidly to a respective peripheral part of said first ring gear to rotate with said first ring gear;

a first element of said second motor being an armature that is connected rigidly to a respective peripheral part of said hub to rotate with said hub;

a first element of said third motor being an armature that is connected rigidly to a respective peripheral part of said second ring gear to rotate with said second ring gear;

a second element of said first electric motor being a first field assembly that is connected mechanically to said housing at a location to interact by its field with said armature on said first ring gear, a second element of said second electric motor being a second field assembly that is connected mechanically to said housing at a location to interact by its field with said armature on said hub;

a second element of said third electric motor being a third field assembly that is connected mechanically to said housing at a location to interact by its field with said armature on said second ring gear, a first shaft connected to said sun gear to rotate with it as driven by said planetary gears, hub and said first ring gear; and a second shaft connected to said sun gear to rotate with it as driven by said planetary gears, hub and said second ring gear;

wherein each said element of the respective one of said electric motors of each said integral combination is said armature thereof.

5. A combination motor and transmission device comprising:

at least three power input means, hereinafter referred to as a first, second and third power input means, said input means for receiving at least three inputs of electrical power; and power conversion means for converting said electrical power of said first, second and third inputs for providing at least two outputs, said power conversion means, including a mechanical power transmission unit, said power transmission unit having at least three inputs for respectively receiving mechanical power corresponding to said first, second and third power inputs provided to said first, second and third power input means and at least two outputs for outputting the converted power as rotational mechanical power, wherein the rotational speed of said outputs are continuously variable, and said power conversion means includes, for each of said first, second and third power inputs, a respective integral combination of a respective electric motor element and an element of said mechanical transmission unit, each said integral combination involving said two respective elements thereof being directly associated mechanically and geometrically with each other without substantial spacing or other elements, including bearings and shafts therebetween;

wherein each of said integral combinations are within an envelope containing the other, whereby a compact structure is provided for each said integral combination, and said integral combinations are located closely adjacent each other;

wherein each said envelope is that of said respective motor element of the respective one of said integral combinations, and each said envelope has effectively a cylindrical symmetry; and wherein said transmission unit comprises a planetary gear unit which includes a first inner sun gear;

a first outer ring gear which has an axis of rotation collinear with that of said first inner sun gear;

a second outer ring gear which has an axis of rotation collinear with that of said second inner sun gear;

two sets of planetary gears held by respective hubs, each of said planetary gears being held by said respective hub to rotate in unison between said first inner sun gear, and said respective outer ring gear, said planetary gears rotating relative to said respective hub in dependence on the difference in rotation between said respective inner and outer gears, said respective hub rotating in dependence on the sum of two rotational velocity components, the first rotational velocity component being the common rotational velocity of said first sun gear and said first and second ring gears, and the second velocity component being the difference between the rotational velocity of said first sun gear and said first and second ring gears and, a housing surrounding, at least in part, said electric motors and transmission unit; and further comprising a first element of said first electric motor being an armature that is connected rigidly to a respective peripheral part of said first ring gear to rotate with said first ring gear;

a first element of said second motor being an armature that is connected rigidly to a respective peripheral part of said first sun gear to rotate with said first sun gear;

a first element of said third electric motor being an armature that is connected rigidly to a respective peripheral part of said second ring gear to rotate with said second ring gear;

a second element of said first electric motor being a first field assembly that is connected mechanically to said armature on said first ring gear and, a second element of said second electric motor being a second field assembly that is connected mechanically to said housing at a location to interact by its field with said armature on said sun gear, a second element of said third electric motor being a first field assembly that is connected mechanically to said armature on said second ring gear;

a first shaft connected at a respective extension of said respective hubs to rotate with it as driven by said planetary gears, sun gear and first ring gear, and a second shaft connected at a respective extension of said respective hubs to rotate with it as driven by said planetary gears, sun gear and second ring gear, wherein each said element of the respective one of said electric motors of each said integral combination is said armature thereof.

* * * * *